(12) United States Patent
Cebron et al.

(10) Patent No.: US 12,340,482 B2
(45) Date of Patent: Jun. 24, 2025

(54) SYSTEMS AND METHODS FOR GENERATING OBJECT DETECTION LABELS USING FOVEATED IMAGE MAGNIFICATION FOR AUTONOMOUS DRIVING

(71) Applicant: FORD GLOBAL TECHNOLOGIES, LLC, Dearborn, MI (US)

(72) Inventors: Nicolas Cebron, Sunnyvale, CA (US); Deva K. Ramanan, Pittsburgh, PA (US); Mengtian Li, Pittsburgh, PA (US); Chitteshwaran Thavamani, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 17/652,348

(22) Filed: Feb. 24, 2022

(65) Prior Publication Data
US 2022/0301099 A1    Sep. 22, 2022

Related U.S. Application Data

(60) Provisional application No. 63/161,895, filed on Mar. 16, 2021.

(51) Int. Cl.
*G06T 3/18*     (2024.01)
*G06T 3/4007*   (2024.01)
*G06T 3/4046*   (2024.01)

(52) U.S. Cl.
CPC ............. *G06T 3/18* (2024.01); *G06T 3/4007* (2013.01); *G06T 3/4046* (2013.01)

(58) Field of Classification Search
None
See application file for complete search history.

(56) References Cited

U.S. PATENT DOCUMENTS

2018/0045818 A1* 2/2018 Majumdar ............ G01S 17/42
2018/0227630 A1* 8/2018 Schmidt ............ H04N 21/4728
(Continued)

FOREIGN PATENT DOCUMENTS

JP    2018082318 A    5/2018

OTHER PUBLICATIONS

Zhao et al ("Saliency Map-Aided Generative Adversarial Network for RAW to RGB Mapping", 2019 IEEE/CVF International Conference on Computer Vision Workshop (ICCVW), Seoul, Korea (South), 2019, pp. 3449-3457, doi: 10.1109/ICCVW.2019.00428, retrieved from the Internet on May 11, 2024) (Year: 2019).*

(Continued)

*Primary Examiner* — Leon Viet Q Nguyen
(74) *Attorney, Agent, or Firm* — Frank A. MacKenzie; Brooks Kushman, P.C.

(57) ABSTRACT

Systems and methods for processing high resolution images are disclosed. The methods include generating a saliency map of a received high-resolution image using a saliency model. The saliency map includes a saliency value associated with each of a plurality of pixels of the high-resolution image. The method then includes using the saliency map for generating an inverse transformation function that is representative of an inverse mapping of one or more first pixel coordinates in a warped image to one or more second pixel coordinates in the high-resolution image, and implementing an image warp for converting the high-resolution image to the warped image using the inverse transformation function. The warped image is a foveated image that includes at least one region having a higher resolution than one or more other regions of the warped image.

20 Claims, 8 Drawing Sheets

(56) References Cited

U.S. PATENT DOCUMENTS

| | | | |
|---|---|---|---|
| 2018/0307935 A1* | 10/2018 | Rao | G06V 10/764 |
| 2019/0026864 A1* | 1/2019 | Chen | G06T 3/4053 |
| 2019/0042888 A1* | 2/2019 | Tsutsui | G06V 10/82 |
| 2019/0132520 A1* | 5/2019 | Gupta | H04N 23/632 |
| 2020/0143194 A1 | 5/2020 | Hou et al. | |
| 2020/0143551 A1* | 5/2020 | Gonzalez Aguirre | G06T 7/174 |
| 2021/0012201 A1 | 1/2021 | Ayush et al. | |
| 2022/0019870 A1* | 1/2022 | Gu | G06N 3/045 |

OTHER PUBLICATIONS

PCT/ISA/220 Notification of Transmittal of the International Search Report for PCT/US2022/071045, dated Jun. 30, 2022.
PCT/ISA/210 International Search Report for PCT/US2022/071045, dated Jun. 30, 2022.
Gonzalez, D. et al., A Review of Motion Planning Techniques for Automated Vehicles, IEEE Transactions on Intelligent Transportation Systes, Nov. 2015.
Jaderberg, M. et al., Spatial Transformer Networks, Google DeepMind, Feb. 2016.
Recasens, A. et al., Learning to Zoom: a Saliency-Based Sampling Layer for Neural Networks, Sep. 10, 2018.
Yurtsever, E. et al., A Survey of Autonomous Driving: Common Practices and Emerging Technologies, IEEE Access, Mar. 25, 2020.

\* cited by examiner

SYSTEMS AND METHODS FOR GENERATING OBJECT DETECTION LABELS USING FOVEATED IMAGE MAGNIFICATION FOR AUTONOMOUS DRIVING

CROSS-REFERENCE TO RELATED APPLICATIONS

This application claims priority to U.S. Provisional Patent Application No. 63/161,895, filed Mar. 16, 2021, the disclosure of which is incorporated herein by reference in its entirety.

BACKGROUND

For a mobile robot to operate autonomously, it should be able to learn about, locate, and possibly avoid objects as it moves within its environment. For example, a robot may acquire images of its environment, process them to identify and locate objects, then plot a path around the objects identified in the images. As such, efficient processing of high-resolution video streams or images is important for many robotics applications such as autonomous driving. A robot such as an autonomous vehicle can have multiple high-resolution cameras to, for example, acquire image data for object detection and tracking. Such autonomous vehicles may also use other sensors, such as RADAR or LIDAR, to acquire additional data about the environment. However, such an "over-sensing" setup provides unique challenges for vision-based algorithms (e.g., for object detection) since visual sensors constantly produce streams of data, and it is important for vision-based algorithms to consume the data and report back the state of the world in a timely manner. This is further exacerbated when vision-based algorithms are used to process video streams (i.e., a continuous series of images).

While numerous techniques exist to make vision-based algorithms run fast, such as quantization, model compression, and inference optimization, image down-sampling is still one of the most common approaches to meet the latency constraint. However, this naive approach greatly restricts an object detection algorithm's capability to identify small objects because image down-sampling removes the high pixel-density advantage of image sensors. Some other methods utilize temporal information to reduce the number of times a vision-based algorithm is invoked. Such methods work well on a simple dataset and are typically designed for offline image processing, but are unsuitable for autonomous vehicles scenarios where multiple new objects may appear in almost every frame.

This document describes methods and systems that are directed to addressing the problems described above, and/or other issues.

SUMMARY

The present disclosure includes implementing systems and methods of processing a high-resolution image (e.g., an image received by a vehicle) are disclosed. The methods may include receiving a high-resolution image and generating a saliency map of the received image using a saliency model. The saliency map can include a saliency value associated with each of a plurality of pixels of the high-resolution image. The methods also include using the saliency map for generating an inverse transformation function that is representative of an inverse mapping of one or more first pixel coordinates in a warped image to one or more second pixel coordinates in the high-resolution image, and implementing an image warp for converting the high-resolution image to the warped image using the inverse transformation function. Optionally, the warped image can be a foveated image that includes at least one region having a higher resolution than one or more other regions of the warped image. The warped image can be saved to a data store.

In various implementations, the methods may also include generating one or more bounding box predictions in a frame of reference of the warped image (e.g., using the warped image). Coordinates of the one or more bounding box predictions in the warped image may be transformed to second coordinates of the one or more bounding box predictions in a frame of reference of the high-resolution image using the inverse transformation function. Optionally, the second coordinates of the one or more bounding box predictions may be used for controlling navigation of an autonomous vehicle.

In one or more scenarios, the methods may include generating the saliency model based on one or more bounding box predictions in at least one prior frame of a video stream that includes the high-resolution image, and where the high-resolution image is captured after the at least one prior frame. Additionally and/or alternatively, the saliency model may be generated based on one or more bounding box predictions in a dataset-wide prior comprising a training dataset.

In various implementations, the at least one region having the higher resolution in the warped image has a high likelihood of including an object of interest. Optionally, a resolution of the one or more other regions of the warped image may be reduced.

In some implementations, the image warp for converting the high-resolution image to the warped image may be implemented using the inverse transformation function by finding an input pixel in the high-resolution image for each of a plurality of pixels of the warped image, and bi-linearly interpolating that pixel's intensity or color from one or more pixels in the high-resolution image adjacent the input pixel.

Optionally, the inverse transformation function can be a differentiable function that is trained using backpropagation.

Additionally and/or alternatively, symmetries may be introduced about each of a plurality of edges of the saliency map for cropping regularization of the warped image.

The implementing systems can comprise: a processor; and a non-transitory computer-readable storage medium comprising programming instructions that are configured to cause the processor to implement a method for operating an automated system. Additionally and/or alternatively, the non-transitory computer-readable storage medium and the programming instructions may be included in a computer program product.

DETAILED DESCRIPTION

Figure 1:
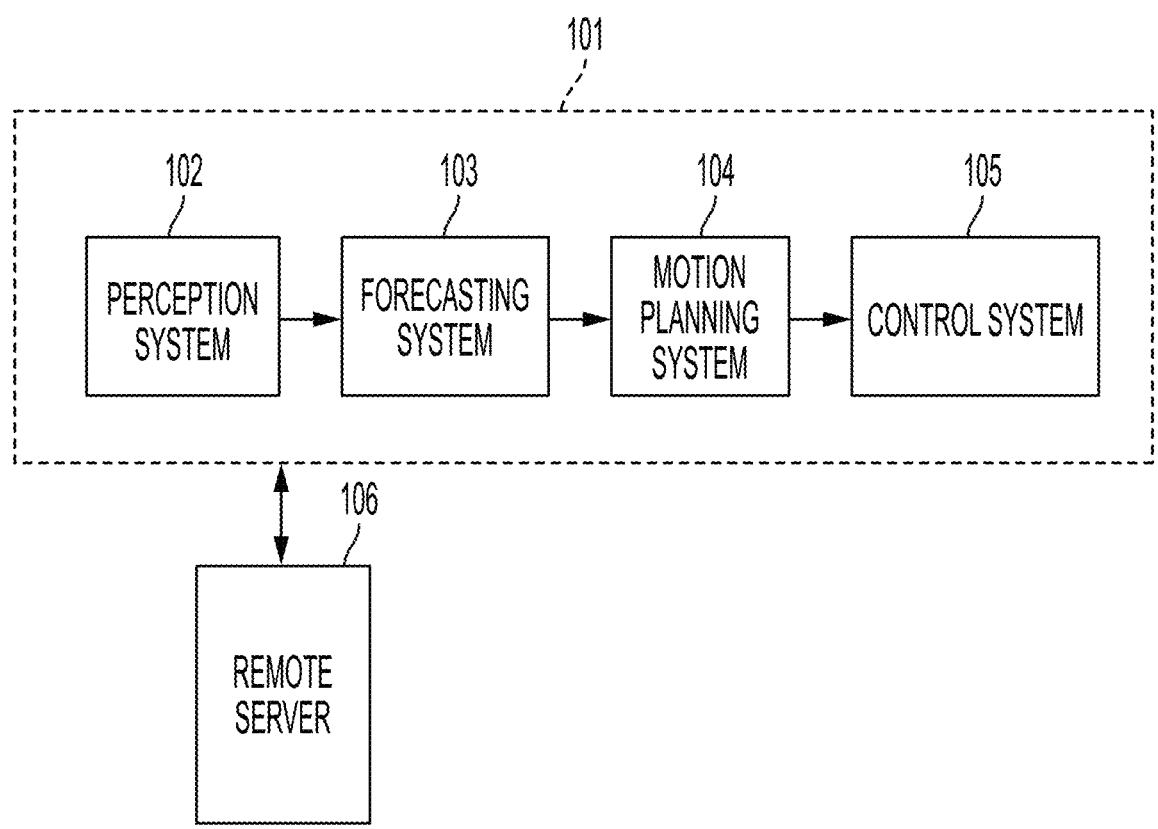
FIG. 1 illustrates an example high-level overview of an autonomous vehicle system.

A conventional robot does not perceive its environment like a human. For example, a robot may "see" its environment by acquiring imagery of some or all or its environment at a uniform resolution, and examining each pixel in the imagery for object detection. This process can take too much time and too much energy to be useful for identifying objects moving relative to the robot. In addition, the robot may spend an inordinate amount of time processing empty or irrelevant pixels.

For example, as discussed, while the large number of visual sensors in an autonomous vehicle ensures a wide field-of-view, and the multi-modality approach provides complementary sensing ability; such an "over-sensing" setup also provides unique challenges (such as increased latency, increased processing power, etc.) for vision-based algorithms such as object detection. While light detection and ranging (LiDAR) sensing is reliable for detecting objects in three dimensions (3D), its low beam density can limit its performance for: detecting far away objects, understanding the precise extent of object boundaries, or doing fine-grained semantic recognition. High-resolution image sensors can help address this because of their high pixel density and rich information contained in the color space. While global image down-sampling has been used to meet the latency constraint of image processing, it also eliminates the high pixel-density advantage of image sensors. This document describes improvements to image processing that preserve the high-density needed for autonomous vehicle vision-based algorithms (e.g., for object detection), while reducing image processing latency, computational requirements, and storage capacity requirements.

The systems and methods of this disclosure utilize an adaptive attentional processing approach to generate a foveated warped image that elastically magnifies certain regions which retain high resolution for objects of interest, while maintaining a small input canvas. The resulting "foveated image" has resolution that varies spatially across each image, with the finest resolution at the magnified or foveated regions and coarser resolution elsewhere. Such magnified regions may include the objects of interest. This notion of obtaining images at a resolution that varies spatially across each image is referred to herein as "foveation."

The input images are down-sampled and warped such that salient areas in the warped image have higher resolutions, using the methods of this disclosure. The magnified regions are those that are believed to have a high probability of containing an object, and whose signal can come from a dataset-wide prior or frame-level prior (bounding box predictions—i.e., predicted object locations—in previous frames) information. This is because in object detection datasets objects of interest usually only cover a portion of an image. Such regional magnification allows algorithms to make better use of a high-resolution input image for performing object detections without incurring the cost of processing such high-resolution input images. Furthermore, unlike existing down-sampling methods where processing the images in the warped space will produce bounding box outputs in the warped space, the current disclosure further describes outputting bounding box prediction labels generated using the warped image in the original un-warped image space.

The methods of this disclosure may be used for, for example, object detection in images, improving streaming performance (for evaluating the output of a perception algorithm at all time instants), or the like, for controlling navigation of an autonomous vehicle.

Before describing the details of the image warping and bounding box prediction methods, it is useful to provide some background information about autonomous vehicle (autonomous vehicle) systems. FIG. 1 shows a high-level overview of autonomous vehicle subsystems that may be relevant to the discussion below. Specific components within such systems will be described in the discussion of FIG. 8 later in this document. Certain components of the subsystems may be embodied in processor hardware and computer-readable programming instructions that are part of the autonomous vehicle's on-board computing system 101.

The subsystems may include a perception system 102 that includes sensors that capture information about moving actors and other objects that exist in the vehicle's immediate surroundings. Example sensors include cameras, LiDAR sensors and radar sensors. The data captured by such sensors (such as digital images, videos including series of image frames, LiDAR point cloud data, or radar data) is known as perception data. The perception system may include one or more processors, and computer-readable memory with programming instructions and/or trained artificial intelligence models that, during a run of the autonomous vehicle, will process the perception data to identify objects and assign categorical labels and unique identifiers to each object detected in a scene. During deployment of the autonomous vehicle, the autonomous vehicle receives perception data from one or more sensors of the autonomous vehicle's perception system. The perception data may include data representative of one or more objects in the environment. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (published in *IEEE Access*, April 2020).

The vehicle's perception system 102 may deliver perception data to the vehicle's forecasting system 103. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 104 and control system 105 so that the receiving systems may assess such data and initiate any number of reactive motions to such data. The motion planning system 104 and control system 105 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

In non-autonomous vehicle embodiments, such as with vehicles that are driven by human operators, the motion planning system 104 may be embodied in processor hardware and computer-readable hardware that are part of an electronic devices that is contained within the vehicle, such as a dashboard navigation system or a mobile electronic device of the operator. In such situations, the electronic device may output the trajectories planned by the motion planning system via a display, an audio speaker, or both. In addition, some parts of the perception system 102 may include a transceiver of an electronic device that receives certain perception data (such as weather data) from a remote server via wireless communication.

The vehicle's on-board computing system 101 will be in communication with a remote server 106. The remote server 106 is an external electronic device that is in communication with the vehicle's on-board computing system 101, either via a wireless connection while the vehicle is making a run, or via a wired or wireless connection while the vehicle is parked at a docking facility or service facility. The remote server 106 may receive data that the vehicle collected during its run, such as perception data and operational data. The remote server 106 also may transfer data or other information to the vehicle such as software updates, high definition (HD) map updates, machine learning model updates and other information.

Figure 2:
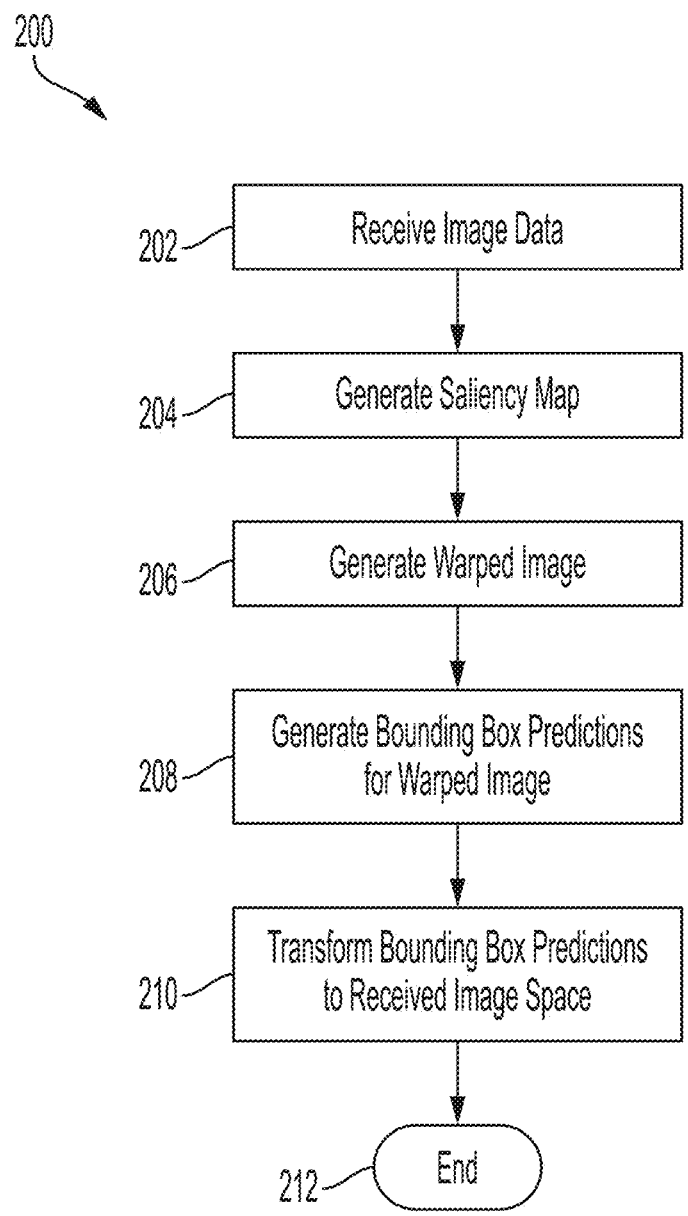
FIG. 2 illustrates an example method for generating bounding box predictions using a foveated warped image.

Referring now to FIG. 2, a flowchart illustrating an example method for generating a foveated warped image and for generating bounding box predictions using the foveated warped image is disclosed. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of an autonomous vehicle.

At 202, the system may receive image data describing an image from a sensor (e.g., camera), a data store, and/or another component of the system 100. For example, the images can be captured by monocular cameras (e.g., cameras), or the like. In some examples, an image comprises 3 layers (or channels) of information superimposed on each other-a Red (R) layer, a Green (G) layer and a Blue (B) layer. This image may also be referred to as an RGB image. In other examples, an image may be a gray-scale image, an infrared image, an ultraviolet image, or any other type of image. The images can be stored in a datastore local to and/or remote from the mobile platform (e.g., remote server 106 of FIG. 1). The image may have a resolution and/or size that needs to be reduced (i.e., down-sampled) before being used as input to image processing algorithms or machine learning models such as object detection models.

At 204, the system may generate a saliency map corresponding to the received image. A saliency map non-uniformly assigns a saliency value to each pixel in an image. A saliency value of a pixel defines the pixel's importance and/or noticeability within the image (i.e., a saliency map quantifies a pixel-level importance). In other words, a saliency map is a topographical representation of unique or noticeable features of an image. The range of saliency values may be, for example, [0,1] (or any other numerical value) where higher values may indicate higher pixel importance and/or noticeability within the image (or vice versa). The saliency value may, optionally, be used as an indication of potential for interest or inclusion in the higher resolution regions during image foveation. Specifically, a saliency map may be used to distinguish potential higher resolution pixels (higher saliency value) from lower resolution or down-sampled pixels (lower saliency value) during creation of a warped image. The saliency value may be assigned to the image pixels based on, for example, object-based saliency, an attention-based saliency, or the like.

Attention-based saliency highlights regions in an image that a typical person is likely to look at. For example, a human typically does not process the detail of an entire image on a pixel-by-pixel basis. Instead, the human eye acquires imagery of non-uniform, resolution: the central part of the retina which is densely packed with light-sensitive cones, acquires the central part of each image at relatively fine resolution. And the peripheral portion of the retina, which is covered at lower density with light-sensitive rods and cones, acquires the peripheral portion of each image at coarser resolution. To account for the spatial variation in image resolution, a human moves his or her eyes rapidly among different points in his or her field of view, and fixates on certain objects or regions more than the rest of the image. For instance, a human may fixate on points at or near an interesting portion of a scene (such as a face, a human, a vehicle, a traffic light etc.) for relatively long periods, and fixate on points at or near less interesting portions of the scene (such as a tree, a sidewalk, etc.) for shorter periods, if at all. As such, pixels in the image corresponding to the more interesting regions may be assigned a higher saliency value compared to pixels of the image corresponding to less interesting regions. Interesting positions of scenes may be previously stored in a database and/or predicted using a machine learning model trained on a training dataset including previously identified interesting portions of a scene.

Object-based saliency, on the other hand, assigns higher saliency values to pixels of certain objects (e.g., foreground objects, moving objects, etc.) compared to certain other objects (e.g., background objects). Such object saliency for various objects may be determined based on a rule set and/or learned automatically.

The system may generate the saliency map using, for example, a machine learning model (e.g., a neural network) that has been trained to assign saliency values to pixels in an image based on information received from a previous image frame in a video stream (frame-level prior) and/or a dataset-wide prior information (e.g., a training dataset). Specifically, the machine learning model is trained to use the information received from a previous image frame in a video stream and/or a dataset-wide prior information as a source of saliency signal. For example, the model may use bounding box predictions corresponding to objects dejected in an image frame of a video stream that has already been processed (e.g., an image frame immediately preceding the image frame being analyzed) for assigning saliency values. This allows for resampling such that background pixels can make room for objects of interest in a down-sampled image. Alternatively and/or additionally, the model may generate a saliency map based on bounding box predictions, corresponding to the image being analyzed, determined from a collection of ground truth bounding boxes in a training dataset. For example, the system may aggregate (e.g., determine an average) or learn, from the training dataset, statistics relating to where to expect certain types of objects (e.g., sidewalks, horizon, vegetational, etc.) in a scene.

To learn or train a saliency model that can generalize to frame-level or dataset-level priors, the system may determine an algorithmic approach for converting bounding boxes (be it from a dataset or the previous frame) to a saliency map. For example, the system may use kernel density estimation (KDE) with the bounding boxes as the data points. More precisely, given a set of bounding box detections B with centers $c_i$, heights $h_i$, and widths $w_i$, the system may model or generate the saliency map $S_f$ for frame f as a sum of normal distributions using the following equation:

$$S_f(a, b) = \sum_i a \cdot \mathcal{N}\left(c_i, b\begin{bmatrix} w_i & 0 \\ 0 & h_i \end{bmatrix}\right)$$

where, a and b are hyperparameters for the amplitude and the bandwidth of a kernel density estimation (KDE) formulation, respectively (may be learned through backpropagation); N is the number of bounding boxes.

Optionally, the saliency map may also take into account bounding box labels to, for example, filter and/or assign saliency values based on object classes of interest.

$S_f$ may be applied to the previous frame prediction to obtain a frame-specific temporal prior (denoted as $S_i$), or to the set of all bounding boxes in the training set to obtain a data-set wide prior (denoted as $S_D$). In the former case, the KDE formulation may foveate the image at each of the previous frame's detections. For the first frame in each video sequence, this trivially defaults to a uniform saliency map. In the latter case, for training datasets, the horizon tends to be in the center of the image, and thus objects are more likely to appear there.

The system may, optionally, average the generated saliency maps in a training dataset to produce a dataset-wide prior ($S_D$). For instance, if the horizon tends to be in the center of the image in a training dataset, and thus objects are more likely to appear in such center, the dataset-wide prior ($S_D$) may capture this bias at the dataset-level, whereas $S_i$ attends to temporal biases. The system may also average $S_d$ and $S_i$ to capture both biases.

The system may, optionally, process the saliency map $S_f$ by adding ($1/k^2$), where K is the side length of the kernel k, and normalizing it such that it sums to 1 in order to avoid extreme warps.

The machine learning model for generating a saliency map may be generated and/or trained using any now or hereafter known techniques such as, without limitation, kernel density estimation (KDE) and convolution neural network (CNN), both of which are differentiable and the parameters can be learned through the final task loss. In KDE, the system may use bounding box centers as the data points that have a bandwidth proportional to the square root of the area of the bounding box. In CNN, the system may represent the bounding boxes as an N×4 matrix, where N is a fixed maximum value for the number of bounding boxes. If there are less than N objects, the input may be zero-padded to this dimension. Once a model has been generated, the system may also apply the model to all bounding boxes in a training dataset to obtain a dataset-wide prior.

The saliency model may then generate a saliency map of the received image based on the assumption that objects of interest will be present within similarly located bounding boxes (as the dataset-wide prior or frame-specific prior) in the received image. Specifically, the model may convert the bounding box information into a saliency map. For instance, interesting portions of the image (e.g., vehicles, faces, etc.) an/or foreground objects may be identified based on the bounding box predictions in the previously processed image frame and/or dataset-wide prior, and used for generating the saliency map. In some implementations, the system may generate the saliency map using bounding box detections determined based on a dataset-wide prior for the first frame in a video image series, and for subsequent image frames in the video image series using each of the previous frame's bounding box detections.

Optionally, a saliency map may be based on other (any now or hereafter known) algorithms that consider any number of factors in the image or streamed video such as the background (e.g., the vegetation around a road may be less salient), the frequency of objects present in the video stream, image contrast (e.g., the center of an image that includes the horizon may be more salient), the visual attention system (i.e., tied to the behavior and neuronal architecture of the human visual system), or the like, for generation of saliency maps.

Figure 3:
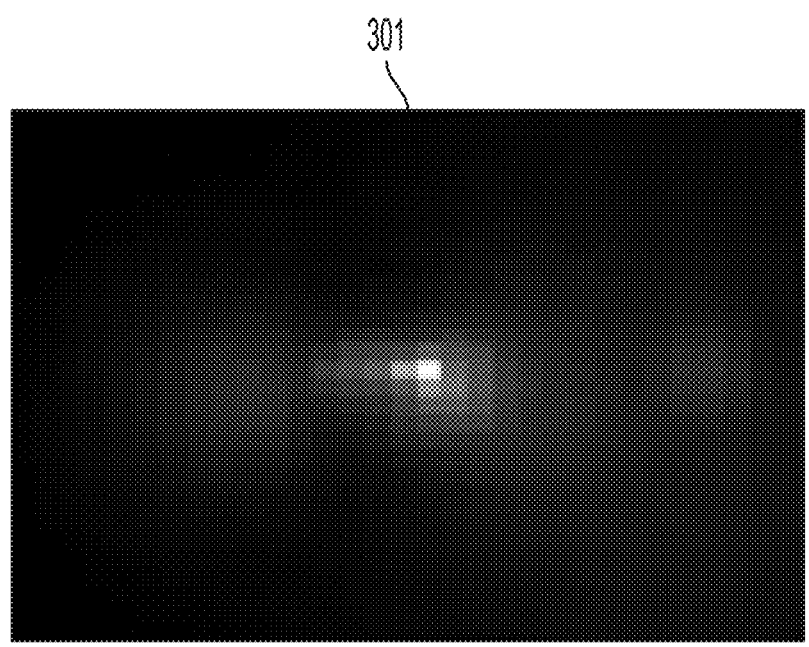
FIG. 3 illustrates an example saliency map generated using the methods of this disclosure.

An example saliency map 301 is illustrated in FIG. 3, where saliency of different regions is directly proportional to its brightness in the map (or as gray scale values).

Next, the system performs warping (206) to create a down-sampled image with regional magnification (foveated warped image) from the received image. In various embodiments, the image may be warped to magnify regions of the image that have a higher saliency value while maintaining a small input canvas. As such, the magnified regions in the warped image are those that have a higher likelihood of including an object of interest (and/or that are otherwise important for an image processing algorithm such as an object detection model).

A warping function (e.g., a machine learning model like a neural network) may be trained for foveating and warping the received image given a spatial transformation function T for transformation of pixel coordinates from the input image to a warped image.

Specifically, a spatial transformation function (e.g., a neural network or other machine learning model) is defined to map bounding box locations (from previous video frames and/or dataset-wide prior) to warping parameters. A 2D transformation can be written as:

$$T:(x,y) \rightarrow (x',y')$$

where, (x,y) and (x',y') are the input and output coordinates of a pixels in the received image and the warped image, respectively. Since image pixels are usually discrete, interpolation is required to sample values at non-integral coordinates. An image warp Wr then takes as input an image I, samples the pixel intensity values according to the given transformation T, and outputs the warped image I' as follows:

$$I'(T(x,y))=I(x,y)$$

Naive forward warping of discrete pixel locations from input I can result in non-integral target pixel positions that need to be "splatted" onto the pixel grid of I, which can produce artifacts such as holes. To overcome this, the image warp may be implemented via a backward mapping by iterating over each target pixel grid location, computing its inverse mapping $T^{-1}$ to find its corresponding input coordinates (which may be non-integral), and bi-linearly interpolating its color/intensity from neighboring input pixel grid points (i.e., the overlaid grid):

$$I'(x,y) = I(T^{-1}(x,y))$$

Since the focus is on transformation of pixel coordinates of the bounding boxes, the implementation of $W_T$ only requires the knowledge of the inverse transformation $T^{-1}$ (and not T). The inverse transformation $T^{-1}$ may be determined using the saliency map. For example, $T^{-1}$ may be parameterized by a saliency map S such that the transformation has a convolution form (therefore fast) and where each pixel in the input space (x,y) may attract samples taken of the original image with a force S (x,y), leading to more sampling at salient regions during the warp. Since $T^{-1}$ is differentiable, it may be trained with backpropagation. For example, a training dataset including ground truth bounding box predictions may be used to train $T^{-1}$ by using estimated saliency maps to create the warped images, identifying bounding boxes in the warped images, performing back-propagation to predict bounding boxes in the original images, and comparing the predicted bounding boxes to the ground truth data to determine a loss function that may be minimized to a desirable value to obtained a trained inverse transformation model $T^{-1}$.

Optionally, pixel iteration during transformation may be replaced with a batch operation by using a grid generator and applying the transformation function $T^{-1}$ over an entire grid. In such examples, the spatial transformation function may include a grid generator and a grid image sampler. Specifically, the spatial transformer may overlay a uniform grid over the received image, and transform one or more pixels of the received image from the overlaid grid to a target grid using the transformation function T.

Figure 4:
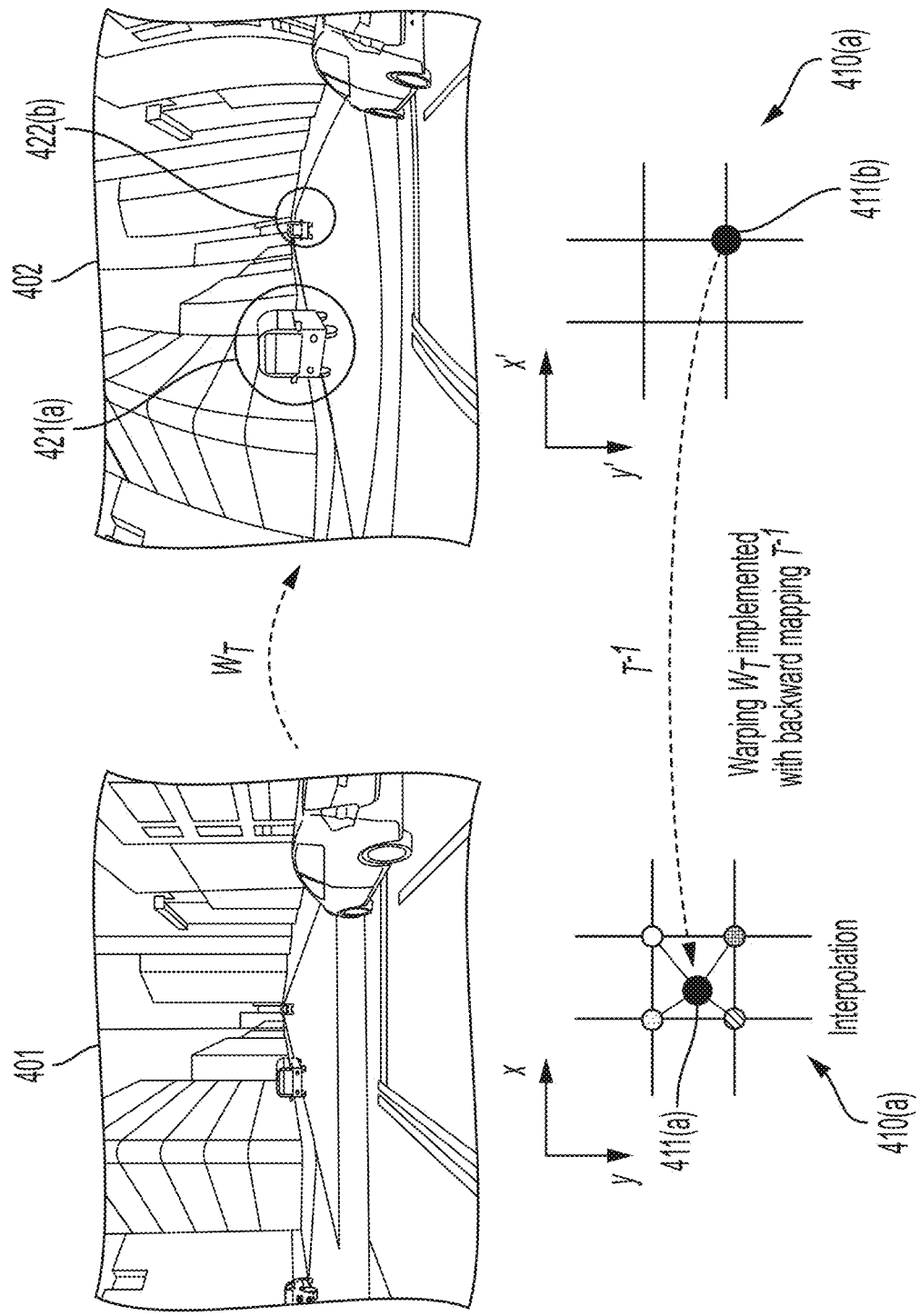
FIG. 4 illustrates an example warped image generated using the methods of this disclosure.

For example, as shown in FIG. 4, while a pixel 411(b) on the target grid 410(b) may have integral coordinates, the corresponding pixel 411(a) on the overlaid grid 410(a) has non-integral coordinates and lies between four integral coordinates. As such, the system performs interpolation to determine the intensity of pixel 411(b) as an average of the four integral coordinate intensity values around the pixel 411(a).

FIG. 4 further illustrates an example received image 401 and the corresponding warped image 402 generated using the methods of this disclosure. As shown, certain objects of interest 421(a), 421(b), etc. are magnified in the warped image 402 compared to the corresponding representations in the received image 401.

In order to ensure that axis alignment of bounding boxes predicted during object detection performed using the downsampled image, the system may restrict the warping (i.e., transformation) to be separable along the two dimensions of the received image such that $T^{-1}(x,y) = (T^{-1}_x(x), T^{-1}_y(y))$. For each dimension, the saliency map may be used to guide the warping using the following equations:

$$T_x^{-1}(x) = \frac{\int_{x'}\left[\int_{y'} S(x',y')\right]k(x',x)x'}{\int_{x'}\left[\int_{y'} S(x',y')\right]k(x',x)},$$

-continued $$T_y^{-1}(y) = \frac{\int_{y'}\left[\int_{x'} S(x',y')\right]k(y',y)y'}{\int_{y'}\left[\int_{x'} S(x',y')\right]k(y',y)},$$

where, k is a distance kernel (e.g., a Gaussian kernel), and S(x',y') is the saliency map generated for the received image.

Often, convolution form of saliency-guided spatial transform tends to crop the images, which might be acceptable for image classification where a large margin exists around the border. However, any cropping in object detection creates a chance to miss objects. In certain implementations, reflect padding on the saliency map may be used while applying the attraction kernel in the above equations, in order to reduce anti-cropping regularization. Specifically, the reflect padding introduces symmetries about each of the edges of the saliency map, eliminating all horizontal offsets along vertical image edges and vice versa thereby eliminating cropping. Typically, object detection has a much lower tolerance to cropping than image classification, since objects appear not only in the center but also near the edges of the image, and previous image warping methods are very susceptible to this issue. The above anti-cropping modification to the warping formulation overcomes such issues.

At 208, the system may input the warped image into any now or hereafter known object detection models to output bounding box predictions in the warped image. Such bounding box predictions are spatial in nature and typically warped.

The system may use the above determined inverse transformation model $T^{-1}$ to back-transform coordinates of the bounding box predictions from the warped image space to coordinates in received image space (210). In other words, pixel coordinates of the predicted bounding boxes in the warped image are transformed to pixel coordinates in the received image. Since standard image warping is implemented via the backward map $T^{-1}$, the backward map is already computed in the trained model or network, and can be directly applied to the pixel coordinates of the predicted bounding box. Specifically, the following equation may be used to generate bounding box predictions in the received image:

$$f(I,T) = T^{-1}(f(W_T(I)))$$

where, f(.) is the non-linear function that returns bounding box pixel coordinates of predicted detections.

Figure 5:
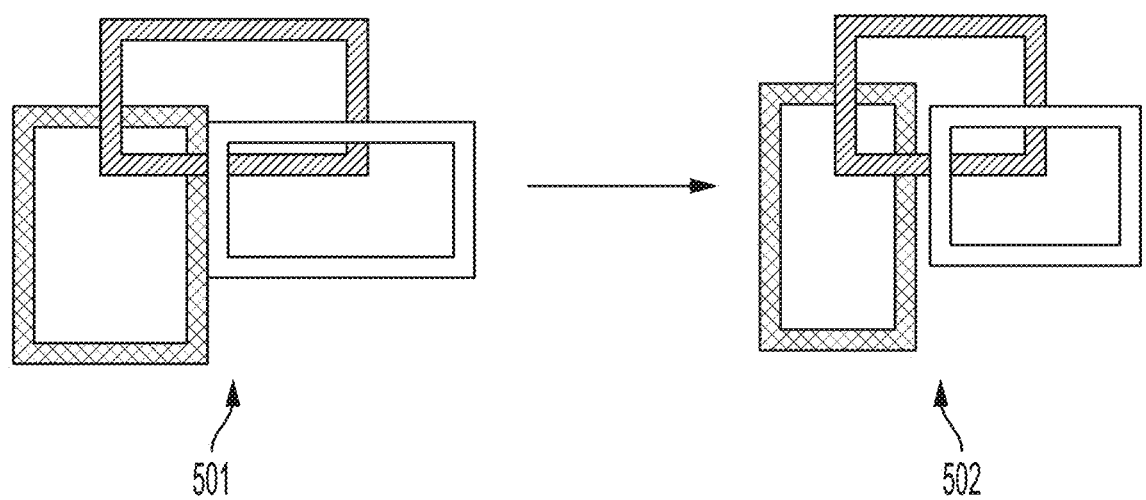
FIG. 5 illustrates an example transformation of bounding box predictions from a warped image space to an original image space.

FIG. 5 illustrates example bounding box predictions (501) in a warped image back-transformed into bounding box predictions for the received image (502). The warped image and/or the bounding box predictions (in the un-warped space) may be stored to for use for, for example, navigation of an autonomous vehicle.

Since for many object detection algorithms, the label L itself is spatially defined (e.g., bounding box coordinates or semantic pixel labels), a label generated from a warped image may itself be warped. To produce consistent outputs (e.g., for computing bounding box losses during training), these warped outputs need to be transformed to the original space of the received image. As such, the above back-transform function outputs inverse-warped labels. It should be noted that while the above description uses bounding box labels as an example, the disclosure is not so limiting, and any may be used for generating labels for warped and unwarped images for other types of spatially defined labels such as semantic pixel labels. The above described methods can, therefore, be used to minimize the loss (f(I),L) of an object detection model learned given a training set of image-label pairs (I,L).

The above disclosure describes an attentional approach that elastically magnifies certain regions of an image while maintaining a small input canvas to generate a down-sampled warped image. The magnified regions are those that are believed to have a high probability of containing an object, whose signal can come from a dataset-wide prior or frame-level prior computed from recent object predictions. The magnification is implemented by, for example, a KDE-based mapping to transform the bounding boxes into warping parameters, which are then fed into an image sampler to generate a warped image with certain magnified regions. The warped image can be fed into an object detection model followed by a differentiable backward mapping to get bounding box outputs in the original image space. Such regional magnification allows image-based algorithms to make better use of high-resolution input without incurring the cost of high-resolution processing.

Once bounding boxes are detected, a track(s) for the objects detected (e.g., a particular instance of an object such as a vehicle, pedestrian, etc.) within the bounding box(es) are optionally determined in. Techniques for determining object tracks are well known. The object track is then optionally used in to control autonomous operations of a mobile platform (e.g., an autonomous vehicle). For example, the predicted cuboids are used to determine a track for the respective object. The object track can then be used to facilitate generation of a platform trajectory which the mobile platform is caused to follow. Subsequently, 212 is performed where method 200 ends or other operations are performed.

Figure 6:
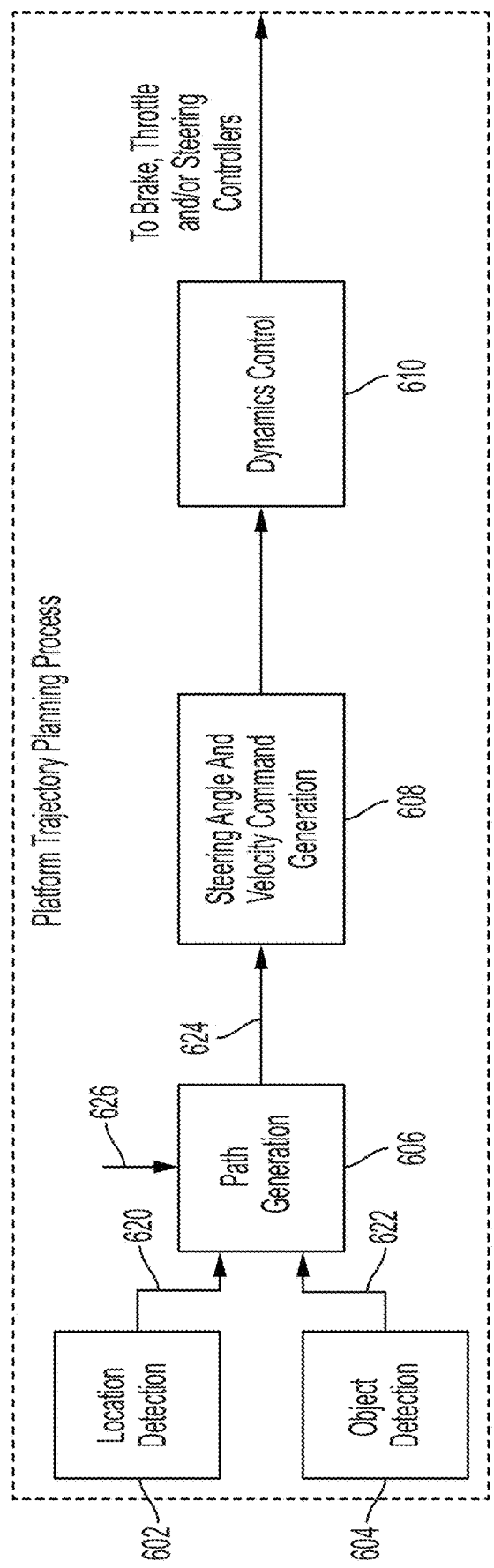
FIG. 6 provides a block diagram that is useful for understanding how a robotic system (e.g., an autonomous vehicle) is controlled in accordance with the present solution.

The predictions (e.g., cuboids) instance masks and sidewalk semantic masks generated during method 200 can be used by a mobile platform for object trajectory prediction, general scene understanding, platform trajectory generation, and/or collision avoidance. A block diagram is provided in FIG. 7 that is useful for understanding how platform control is achieved in accordance with the object related information estimated based on the modified image. All or some of the operations performed in FIG. 6 can be performed by the on-board computing device of a mobile platform (e.g., 101 in FIG. 1) and/or a remote computing device (e.g., remote server 106 of FIG. 1).

In block 602, a location of the mobile platform is detected. This detection can be made based on sensor data output from a location sensor (e.g., location sensor 760 of FIG. 7) of the mobile platform. This sensor data can include, but is not limited to, GPS data. Information 620 specifying the detected location of the mobile platform is then passed to block 606.

In block 604, an object is detected within proximity of the mobile platform. This detection is made based on sensor data output from a camera (e.g., camera 762 of FIG. 7) of the mobile platform and/or LiDAR datasets generated by a LiDAR system (e.g., LiDAR system 764 of FIG. 7) of the mobile platform. The manner in which the image-based perception is achieved was discussed above in relation to FIG. 2. Image-based perception information 622 about the detected object is passed to block 606. This information includes, but is not limited to, cuboid information (e.g., a position of an object, an orientation of the object, and a spatial extent of the object), an initial predicted trajectory of the object, a speed of the object, and/or a classification of the object. The initial predicted object trajectory can include, but is not limited to, a linear path pointing in the heading direction of the object.

In block 606, a platform trajectory is generated using the information from blocks 602 and 604. Techniques for determining a platform trajectory are well known in the art. Any known or to be known technique for determining a platform trajectory can be used herein without limitation. For example, in some scenarios, such a technique involves determining a trajectory for the mobile platform that would pass the object when the object is in front of the mobile platform, the object has a heading direction that is aligned with the direction in which the mobile platform is moving, and the object has a length that is greater than a threshold value. The present solution is not limited to the particulars of this scenario. The platform trajectory 624 can be determined based on the information 620, the image-based perception information 622, and/or a road map 626 which is pre-stored in a datastore of the mobile platform. The platform trajectory 624 may represent a smooth path that does not have abrupt changes that would otherwise provide passenger discomfort. For example, the platform trajectory is defined by a path of travel along a given lane of a road in which the object is not predicted travel within a given amount of time. The platform trajectory 624 is then provided to block 608.

In block 608, a steering angle and velocity command is generated based on the platform trajectory 624. The steering angle and velocity command are provided to block 610 for dynamics control.

Notably, this document describes the present solution in the context of an autonomous vehicle. However, the present solution is not limited to autonomous vehicle applications. The present solution may be used in other applications such as robotic applications, radar system applications, metric applications, and/or system performance applications.

Figure 7:
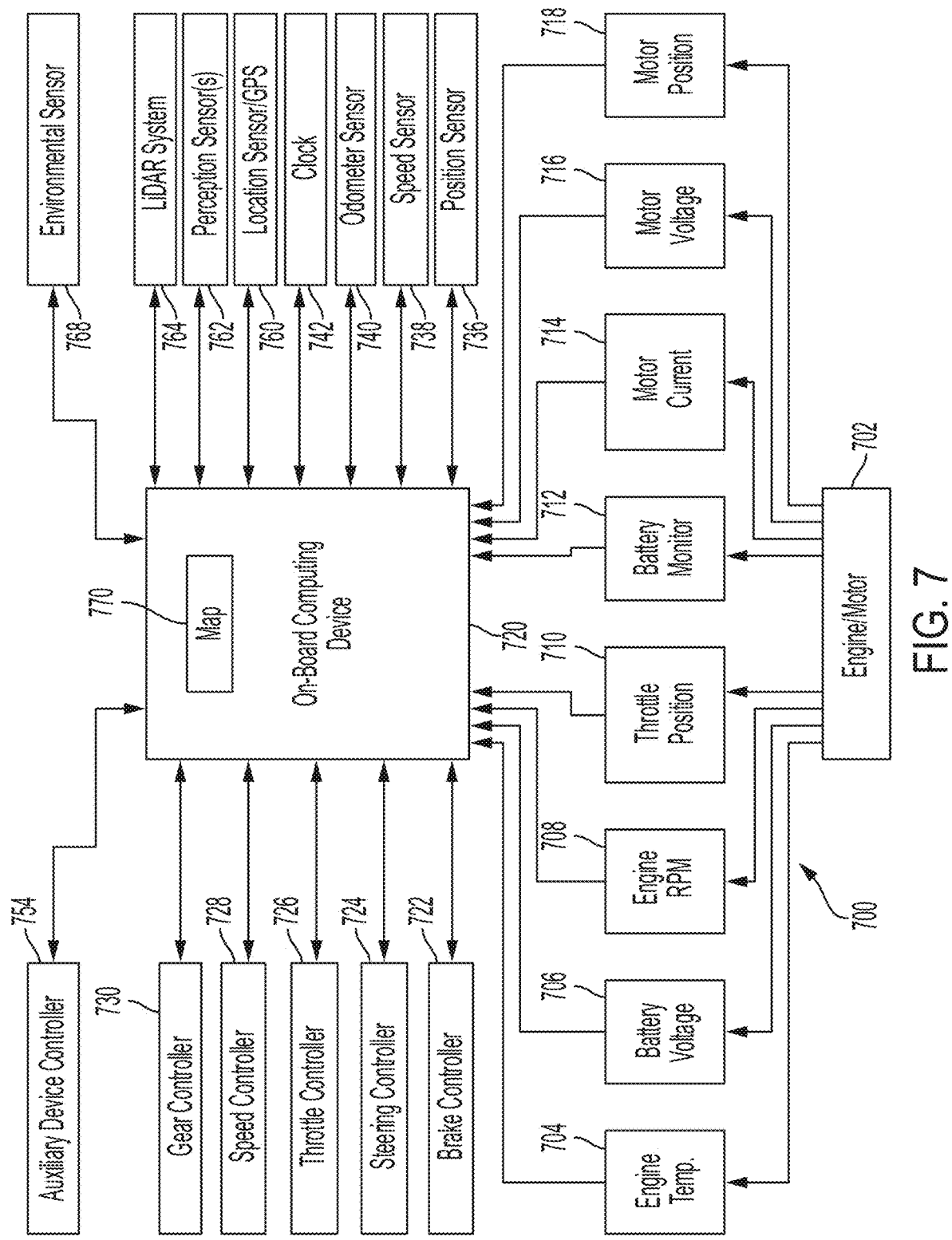
FIG. 7 illustrates example systems and components of an autonomous vehicle.

Referring now to FIG. 7, there is provided an illustration of an illustrative system architecture for a mobile platform 700, such as an autonomous vehicle. As shown in FIG. 7, the mobile platform 700 includes an engine or motor 702 and various sensors 704-718 for measuring various parameters of the mobile platform. In gas-powered or hybrid mobile platforms having a fuel-powered engine, the sensors may include, for example, an engine temperature sensor 704, a battery voltage sensor 706, an engine Rotations Per Minute (RPM) sensor 708, and a throttle position sensor 710. If the mobile platform is an electric or hybrid mobile platform, then the mobile platform may have an electric motor, and accordingly will have sensors such as a battery monitoring system 712 (to measure current, voltage and/or temperature of the battery), motor current 714 and motor voltage 716 sensors, and motor position sensors such as resolvers and encoders 718.

Operational parameter sensors that are common to both types of mobile platforms include, for example: a position sensor 736 such as an accelerometer, gyroscope and/or inertial measurement unit; a speed sensor 738; and an odometer sensor 740. The mobile platform also may have a clock 742 that the system uses to determine mobile platform time during operation. The clock 742 may be encoded into an on-board computing device, it may be a separate device, or multiple clocks may be available.

The mobile platform also will include various sensors that operate to gather information about the environment in which the mobile platform is traveling. These sensors may include, for example: a location sensor 760 (e.g., a Global Positioning System (GPS) device); and perception sensors 762 such as one or more image based sensors (e.g., cameras), radio detection and ranging sensor (radar), sonar sensor, light detection and ranging sensor (LiDAR system 764), or the like. The sensors also may include environmental sensors 768 such as a precipitation sensor and/or ambient temperature sensor. The perception sensors may enable the mobile platform to detect objects that are within a given distance range of the mobile platform 700 in any direction, while the environmental sensors collect data about environmental conditions within the mobile platform's area of travel.

During operations, information is communicated from the sensors to the on-board computing device 720. The on-board computing device 720 can (i) cause the sensor information to be communicated from the mobile platform to an external device (e.g., computing device 101 of FIG. 1) and/or (ii) use the sensor information to control operations of the mobile platform. For example, the on-board computing device 720 may control: braking via a brake controller 732; direction via a steering controller 724; speed and acceleration via a throttle controller 226 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 760 to the on-board computing device 720, which may then access a map of the environment that corresponds to the location information to determine known fixed features of the environment such as streets, buildings, stop signs and/or stop/go signals.

In some scenarios, the on-board computing device 720 detect a moving object and perform operations when such detection is made. For example, the on-board computing device 720 may generate one or more possible object trajectories for the detected object, and analyze the possible object trajectories to assess the risk of a collision between the object and the autonomous vehicle if the autonomous vehicle was to follow a given platform trajectory. If the risk does not exceed the acceptable threshold, then the on-board computing device 720 may cause the mobile platform 200 to follow the given platform trajectory. If the risk exceeds an acceptable threshold, the on-board computing device 720 performs operations to: (i) determine an alternative platform trajectory and analyze whether the collision can be avoided if the mobile platform follows this alternative platform trajectory; or (ii) causes the mobile platform to perform a maneuver (e.g., brake, accelerate, or swerve).

The mobile platform also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

In addition, the autonomous vehicle may include an onboard display device (not shown here) that may generate and output interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 8:
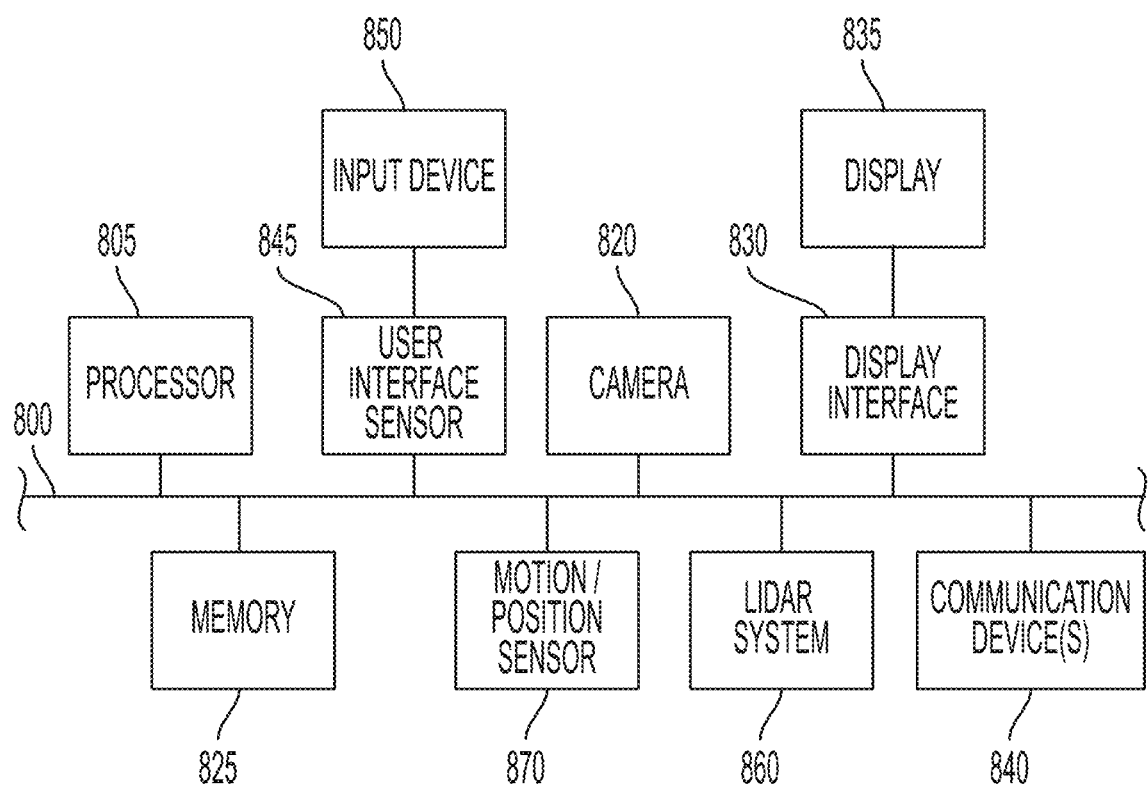
FIG. 8 is a block diagram that illustrates various elements of a possible electronic subsystem of an autonomous vehicle and/or external electronic device.

FIG. 8 depicts an example of internal hardware that may be included in any of the electronic components of the system, such as internal processing systems of the autonomous vehicle or remote servers. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 830 may permit information from the bus 800 to be displayed on a display device 835 in visual, graphic or alphanumeric format, such on an in-dashboard display system of the vehicle. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication system. The communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard or keypad, a joystick, a touchscreen, a touch pad, a remote control, a pointing device and/or microphone. Digital image frames also may be received from a camera 820 that can capture video and/or still images. The system also may receive data from a motion and/or position sensor 870 such as an accelerometer, gyroscope or inertial measurement unit. The system also may include and receive data via a LiDAR system 860, when used in the context of autonomous vehicles. The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method of processing a high-resolution image, the method comprising, by a processor:
    receiving a high-resolution image;
    generating, using a saliency model, a saliency map of the high-resolution image, the saliency map comprising a saliency value associated with each of a plurality of pixels of the high-resolution image;
    generating, using the saliency map, an inverse transformation function that is representative of an inverse mapping of one or more first pixel coordinates in a warped image to one or more second pixel coordinates in the high-resolution image;

implementing, using the inverse transformation function, an image warp for converting the high-resolution image to the warped image, the warped image being a foveated image that includes at least one region having a higher resolution than one or more other regions of the warped image; and saving the warped image to a data store.

2. The method of claim 1, further comprising:

generating, using an object detection model, one or more bounding box predictions in a frame of reference of the warped image; and transforming, using the inverse transformation function, first coordinates of the one or more bounding box predictions in the warped image to second coordinates of the one or more bounding box predictions in a frame of reference of the high-resolution image.

3. The method of claim 2, further comprising using the second coordinates of the one or more bounding box predictions for controlling navigation of an autonomous vehicle.

4. The method of claim 1, further comprising generating the saliency model based on one or more bounding box predictions in at least one prior frame of a video stream, the high-resolution image being a part of the video stream and is captured after the at least one prior frame.

5. The method of claim 1, further comprising generating the saliency model based on one or more bounding box predictions in a dataset-wide prior comprising a training dataset.

6. The method of claim 1, wherein the at least one region having the higher resolution in the warped image has a high likelihood of including an object of interest.

7. The method of claim 1, further comprising reducing a resolution of the one or more other regions of the warped image.

8. The method of claim 1, wherein implementing, using the inverse transformation function, the image warp for converting the high-resolution image to the warped image comprises for each of a plurality of pixels of the warped image:

finding an input pixel in the high-resolution image; and bi-linearly interpolating that pixel's intensity or color from one or more pixels in the high-resolution image adjacent the input pixel.

9. The method of claim 1, wherein the inverse transformation function is a differentiable function that is trained using backpropagation.

10. The method of claim 1, further comprising introducing symmetries about each of a plurality of edges of the saliency map for cropping regularization of the warped image.

11. A system for processing a high-resolution image, the system comprising:

a processor; and a non-transitory computer readable medium comprising programming instructions that when executed by the processor, will cause the processor to:

receive a high-resolution image;

generate, using a saliency model, a saliency map of the high-resolution image, the saliency map comprising a saliency value associated with each of a plurality of pixels of the high-resolution image;

generate, using the saliency map, an inverse transformation function that is representative of an inverse mapping of one or more first pixel coordinates in a warped image to one or more second pixel coordinates in the high-resolution image;

implement, using the inverse transformation function, an image warp for converting the high-resolution image to the warped image, the warped image being a foveated image that includes at least one region having a higher resolution than one or more other regions of the warped image; and save the warped image to a data store.

12. The system of claim 11, further comprising programming instructions that when executed by the processor, will cause the processor to:

generate, using an object detection model, one or more bounding box predictions in a frame of reference of the warped image; and transform, using the inverse transformation function, first coordinates of the one or more bounding box predictions in the warped image to second coordinates of the one or more bounding box predictions in a frame of reference of the high-resolution image.

13. The system of claim 12, further comprising programming instructions that when executed by the processor, will cause the processor to use the second coordinates of the one or more bounding box predictions for controlling navigation of an autonomous vehicle.

14. The system of claim 11, further comprising programming instructions that when executed by the processor, will cause the processor to generate the saliency model based on one or more bounding box predictions in at least one prior frame of a video stream, the high-resolution image being a part of the video stream and is captured after the at least one prior frame.

15. The system of claim 11, further comprising programming instructions that when executed by the processor, will cause the processor to generate the saliency model based on one or more bounding box predictions in a dataset-wide prior comprising a training dataset.

16. The system of claim 11, wherein the at least one region having the higher resolution in the warped image has a high likelihood of including an object of interest.

17. The system of claim 11, further comprising programming instructions that when executed by the processor, will cause the processor to reduce a resolution of the one or more other regions of the warped image.

18. The system of claim 11, wherein the programming instructions that when executed by the processor, will cause the processor to implement, using the inverse transformation function, the image warp for converting the high-resolution image to the warped image further comprise programming instructions to cause the processor to, for each of a plurality of pixels of the warped image:

find an input pixel in the high-resolution image; and bi-linearly interpolate that pixel's intensity or color from one or more pixels in the high-resolution image adjacent the input pixel.

19. The system of claim 11, wherein the inverse transformation function is a differentiable function that is trained using backpropagation.

20. A non-transitory computer program product for processing a high-resolution image, the computer program product comprising a memory that stores programming instructions that are configured to cause a processor to:

receive a high-resolution image;

generate, using a saliency model, a saliency map of the high-resolution image, the saliency map comprising a saliency value associated with each of a plurality of pixels of the high-resolution image;

generate, using the saliency map, an inverse transformation function that is representative of an inverse mapping of one or more first pixel coordinates in a warped image to one or more second pixel coordinates in the high-resolution image;
implement, using the inverse transformation function, an image warp for converting the high-resolution image to the warped image, the warped image being a foveated image that includes at least one region having a higher resolution than one or more other regions of the warped image; and
save the warped image to a data store.

* * * * *